350-3.6 SR

XR 3,851,308

United Stat

Kawasaki et al.

[11] 3,851,308

[45] Nov. 26, 1974

[54] PATTERN IDENTIFICATION SYSTEM UTILIZING COHERENT LIGHT

[75] Inventors: Harumi Kawasaki; Hizashi Sonezaki; Norihiko Yoshimura, all of Tokyo, Japan

[73] Assignee: Asahi Kogaku Kogyo Kabushiki Kaisha, Tokyo, Japan

[22] Filed: Feb. 12, 1973

[21] Appl. No.: 332,017

[30] Foreign Application Priority Data

Feb. 14, 1972 Japan .............................. 47-15477

[52] U.S. Cl. .......................................... 340/146.3 P

[51] Int. Cl. ............................................ G06k 9/08

[58] Field of Search ........... 340/146.3 P, 146.3 AG; 350/3.5

[56] References Cited

UNITED STATES PATENTS

| | | | |
|---|---|---|---|
| 3,602,887 | 8/1971 | Chow | 340/146.3 P |
| 3,622,988 | 11/1971 | Caulfield et al. | 340/146.3 P |
| 3,624,605 | 11/1971 | Aagard | 340/146.3 P |
| 3,729,634 | 4/1973 | Jensen et al. | 350/3.5 |

*Primary Examiner*—Gareth D. Shaw
*Assistant Examiner*—Joseph M. Thesz, Jr.
*Attorney, Agent, or Firm*—Steinberg & Blake

[57] ABSTRACT

A pattern identification system utilizing coherent light. In order to identify the patterns of a given group, a number of identifying patterns having configurations most of which form only parts of the patterns to be identified and which are characteristic of different patterns of the group to be identified are recorded on a carrier which is used to store matched filters of the identifying patterns on a hologram dry-plate. The number of identifying patterns are stored in this way so that one or a combined limited number of the identifying patterns will be only sufficient to discriminate between similar patterns while maintaining a minimum degree of diffusion in the pattern information. The hologram dry-plate with the information stored thereby is then used in an optical system in which images of the patterns to be identified are treated with the matched filters to form correlative images from which signals are derived for identifying the patterns. The correlative images as well as the stored matched filters are distributed in rows and columns according to a lattice arrangement. During the storing of the matched filters in the hologram dry-plate as well as during subsequent identification of images compensation is made for different light intensities so that the discrimination ratio is improved by minimizing the influence of different light intensities. Thus, with the matched filter derived in the above manner it is possible to transmit to the matched filter an image of a pattern to be identified to derive in a given output plane correlative images which can be photoelectrically sensed to provide electrical signals which are transmitted to an identifying circuit which will automatically identify a pattern.

5 Claims, 10 Drawing Figures

3851308
OR IN 340/146.3P

Table - 2

| similar characters: group | similar characters: character | elements: common | elements: classificatory |
|---|---|---|---|
| i | ア | ㇷ | ) |
| | マ | | *、 |
| | ヤ | | ×＼ |
| ii | キ | ニ | ＼ |
| | ニ | | |
| | エ | | △丨 |
| iii | ン | ン | |
| | シ | | ⺀ |
| iv | ソ | ソ | |
| | ツ | | 〃 |
| v | ノ | ノ | |
| | メ | | *、 |
| vi | フ | フ | |
| | ワ | | ┌ |
| | ウ | | 亠 |
| vi | ヲ | フ | ¬ |
| | ラ | | 一 |
| vii | ク | ク | |
| | タ | | *、 |
| viii | ル | レ | ノ |
| | レ | | |
| ix | ス | ス | |
| | ヌ | | メ |
| x | コ | コ | |
| | ロ | | △丨 |
| | ユ | | 丄 |
| | ヨ | | ⊣ |

Table - 1

| 1 | 2 | 3 | 4 | 5 | 6 | 7 | 8 | 9 | 0 | numerals |
|---|---|---|---|---|---|---|---|---|---|---|
| $t_1$ | $t_2$ | $t_6$ | $t_1$ | $t_4$ | $t_4$ | $t_2$ | $t_7$ | $t_4$ | $t_5$ | element logies |
| — | $t_6$ | $t_9$ | $t_2$ | $t_2$ | $t_6$ | $t_3$ | $t_8$ | $t_7$ | — | |
| $t_1$ | $t_6$ | | $t_4$ | $t_3$ | $t_9$ | $t_7$ | $t_8$ | $t_2$ | $t_5$ | element codes |
| I | ⌒ | | o | / | < | ◡ | x | — | 0 | elements |

Table - 3

Chinese characters 1) of few strokes (fewer than 7 strokes)
........ example: 二·人·力·刀·木·本 田·白·糸·身·虫
2) laterally separable (left-hand radicals, bodies, etc.)
   of two elements...... 信·使·町·略
   of three elements.... 湖·攪 (laterally and vertically)
3) vertically separable (crown parts, lid parts, etc.)
   of two elements...... 肩·宮·焦
   of three elements.... 密·歴·慰·熊 where:

1) the similar left-hand radicals and crown parts such as (亻:彳), (木:禾), (冫:氵), (冖:宀) and (⺍:⺌:⺈) are decomposed into two elements, respectively; and
2) the element (木) of (木·林·森) is regarded to be classified into three different kinds.

PATTERN IDENTIFICATION SYSTEM UTILIZING COHERENT LIGHT

BACKGROUND OF THE INVENTION

The present invention relates to systems for identifying two-dimensional patterns.

In particular, the present invention relates to systems of this type which utilize coherent light.

There are at the present time two types of identification or determination of characters or patterns, namely, the so-called OCR (Optical Character Reader) system and the light filtering system. With both of these systems it has been proposed to extract characteristics peculiar to a given two-dimensional pattern and to introduce various observation parameters with respect to a given character pattern. Although the standards for determining whether given observation parameters are correct or incorrect have been estimated depending upon whether the pattern to be identified is in the form of a special anomalous character, as in the OCR system, a printed or type-written character, or a hand-written character, these systems have for the most part been based upon a higher ratio of discrimination between patterns (i.e., a higher S/N ratio) and a lower percentage of erroneous identification (in a statistical sense), or in other words on the degree of diffusion involved in the obeservation parameters.

The OCR system generally involves a large number of observation parameters and the degree of diffusion of the pattern information is usually higher than the required level since the logical processing during identification of a pattern is achieved by an electronic computer. As a result, the known OCR systems are necessarily of large dimensions and involve extremely high costs, while at the same time the patterns which can be effectively handled by this type of system have been limited to characters which are standardized in a special way (e.g., EB — 13), postal numbers, and the like. A system according to which hand-written characters also may be identified using topological procedures introduced into the observation parameters (in which the presence of a loop, a diverging point and a sharp point are also detected) is at the present time only in a developmental stage.

Light-filtering techniques, on the other hand, are characterized by the fact that the optical part of the system functions to process the pattern information in a two-dimensional manner with different information patterns being capable of simultaneous transmission, and the memory pattern functions which conventionally have been carried out by an electronic computer are replaced by an optical memory system in the form of matched filters. As a result the electronic circuitry for pattern identification can be simplified and the pattern identifying structure can have a relatively low cost and can be made compact and designed to respond rapidly. However, lightfiltering techniques as known up to the present time are disadvantageous in that the diffusion of the pattern information which must be read is insufficient and discrimination between similar patterns is difficult to carry out since the pattern information corresponds to an optical correlative image (a bright point). Employment of a code conversion hologram formed by superimposing an optical code on an input pattern has been proposed to overcome these disadvantages. Furthermore, the so-called Band correlating method derived from the analog construction of a neuron in the ophthalmic nerve of an animal as well as the so-called joint point detecting method which is a topological method for extraction of characteristics in a character pattern are also at the present time in a developmental stage designed to form improved methods to be introduced into the pattern identification utilizing observation parameters for improving the degree of diffusion of the pattern information.

SUMMARY OF THE INVENTION

It is accordingly a primary object of the present invention to provide a pattern identificatqon system utilizing a coherent light filtering technique in which there is a minimum degree of diffusion of the pattern information for the purpose of pattern identification.

Thus, it is an object of the present invention to improve the discrimination ratio in identifying patterns while at the same time being capable of continuously reading patterns at high velocity.

Also, it is an object of the present invention to provide a system which is of low cost and compact construction.

Moreover, it is an object of the invention to provide a system of this type which requires no writing circuit or memory circuit for the patterns, with the memory system being limited to the optical part of the structure.

Moreover, it is an object of the present invention to provide a system according to which the factor of different light intensities for different patterns is eliminated so as to improve the discrimination ratio in identifying similar patterns.

It is also an object of the present invention to provide a system capable of achieving a multiplex storing of matched filters which can be used in connection with a simplified yet highly effective identification of patterns.

Furthermore, it is an object of the invention to provide a system capable of simultaneously processing a number of signals for identifying a given pattern.

In particular, it is an object of the present invention to provide a system capable of operating on the basis of a relatively small number of identifying patterns whose configurations correspond to characteristic parts of the patterns to be identified with the number of these identifying patterns conforming to the minimum number required for identification when the patterns are utilized either singly or in given limited combinations, with the degree of diffusion being maintained at the minimum necessary to achieve proper discrimination between similar patterns.

According to the invention a matched filter means is provided for storing in the form of matched filters a number of identifying patterns which will achieve a minimum degree of diffusion consistent with proper discrimination between similar patterns, this matched filter means being combined with an optical means for transmitting to the matched filter means an image of a pattern which is to be identified in such a way that correlative images are formed in an output plane in accordance with the identifying patterns stored at the matched filter means, and a photosensitive means responds to the correlative images at the output plane and transmits corresponding electrical signals to an identifying circuit means which processes these signals to identify a given pattern. The matched filter means is manufactured by transmitting to a hologram dry-plate images of the above identifying patterns to be stored in the hologram dry-plate with the stored information being distributed according to a lattice arrangement, and during the transmission of images of patterns to be identified to the matched filter there are formed in an output plane correlative images which are also distributed according to a lattice arrangement. During the storing of the images in the hologram dry-plate as well as during subsequent identification of patterns compensation is made for variations in light intensity so that the influence of this latter factor is minimized.

BRIEF DESCRIPTION OF DRAWINGS

The invention is illustrated by way of example in the accompanying drawings which form part of this application and in which.

Figures 1, 1A, 1B:
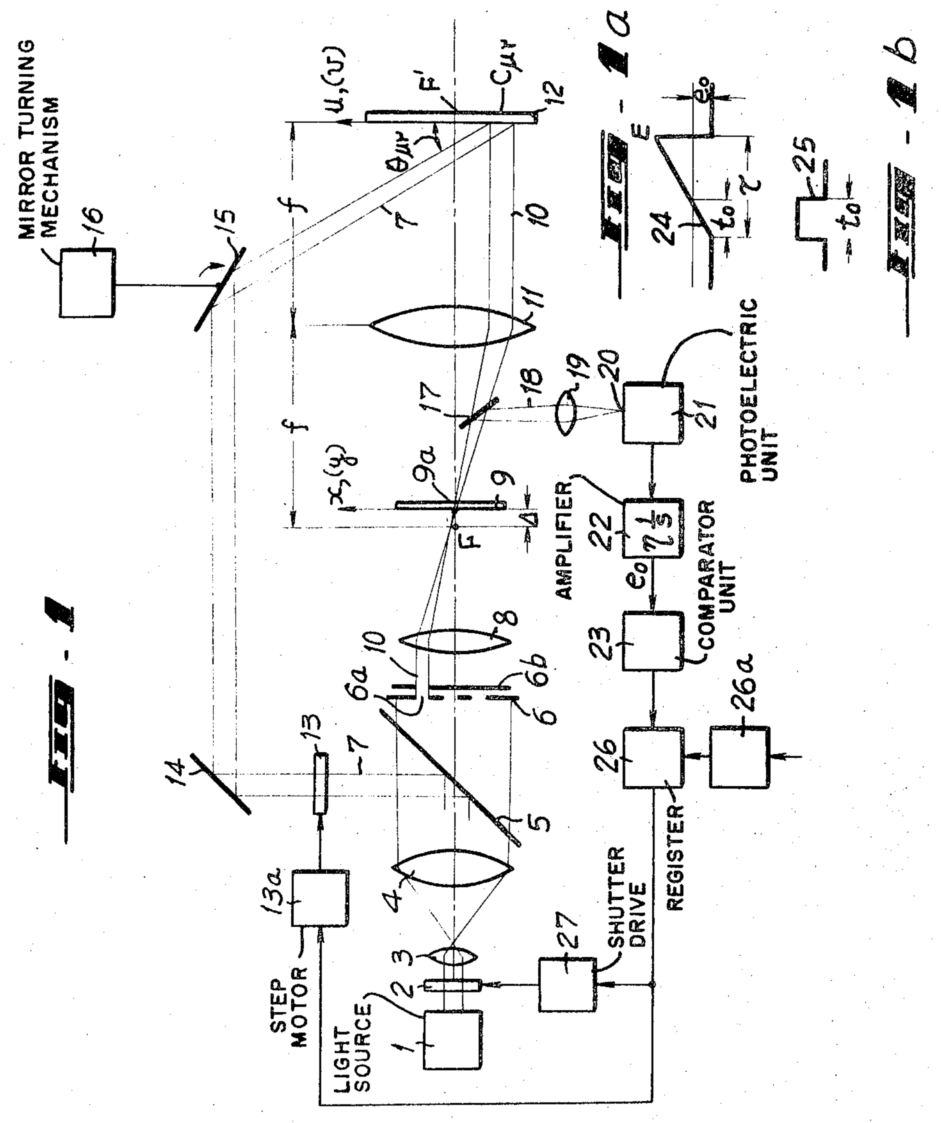
FIG. 1 is a schematic illustration of a system for manufacturing a matched filter means of the invention.
FIG. 1*a* is a wave diagram illustrating a wave shape formed with a control structure of FIG. 1.
FIG. 1*b* is a pulse diagram of a pulse formed from the wave of FIG. 1*a;*

Table 1 illustrates identifying patterns for numerical characters;

Table 2 illustrates identifying patterns which may be utilized with Japanese characters; and Table 3 illustrates how Chinese characters may be broken down into identifying patterns.

DESCRIPTION OF PREFERRED EMBODIMENTS

The present invention includes a number of advantages and features as follows:

I. A group of input patterns are decomposed or broken down into a plurality of basic identifying pattern elements which may be considered as elements of characters in the case where the patterns are in the form of characters, and sets of optical correlative images between an arbitrary input pattern and any one of the identifying pattern elements included in the input pattern are used as a group of observation parameters, instead of utilizing optical correlation of the patterns themselves, so as to improve in this way the discriminating ratio for similar patterns. Use of a plurality of correlative images in this way is capable of greatly improving the degree of diffusion of the pattern information in a system utilizing light-filtering techniques, inasmuch as an arbitrary pattern may be regarded as consisting of two to four basic identifying pattern elements. The number of these basic elements is, however, confined to the minimum necessary so as to avoid complications resulting from an excessive degree of discrimination, as is encountered with known OCR systems.

II. These basic identifying pattern elements are stored in a multiplex manner in the form of matched filters. In other words, a group of identifying patterns are optically stored in the form of sets of basic identifying pattern elements or as characteristic parts of the patterns which are to be identified.

III. The matched filter memories are distributed in a lattice arrangement according to the different identifying patterns. There is, on the other hand, an alternative arrangement where all of the matched filters corresponding to all of the pattern elements are arranged in multilayer form on a common point (e.g., on the optical axis) as multiple exposure holograms. In such a case, the direction of the reference light must be varied in the hologram recording for each pattern element, but the S/N ratio in the detection of pattern elements would be disadvantageously reduced due to the multi-exposure of such a system because of the non-linearity of the memory medium (a hologram dry-plate). According to the present invention, the spatial separation of pattern elements is provided to avoid this disadvantage.

IV. Correlative images derived from an arbitrary input pattern and the matched filters are spaced in the form of points distributed in a lattice arrangement also in an output plane (based on the characteristics referred to above in paragraph III). Therefore, it is possible to identify an input pattern by parallel and simultaneous identification of a plurality of identifying pattern elements of the output plane. Thus it is one of the most significant advantages and features of the present invention that neither a writing circuit nor a memory circuit for the patterns are required except in connection with the optical memory system referred to above.

V. The correlative output of the identifying pattern elements used as the observation parameters is normalized depending upon the area each particular identifying pattern occupies. Thus, a method is employed in such a way that an identical output signal level is achieved in the electronic circuitry irrespective of the size of the particular identifying pattern element. The result is an improvement in the discrimination ratio with respect to identification of similar patterns since when a particular pattern element provides a correlative output level different from those of other pattern elements, mutual correlative outputs between the particular pattern element and any other pattern element are higher than self correlative outputs of a particular pattern element. Normalization of this type is also utilized in making the matched filters, and the amount of light transmitted by each pattern element is photoelectrically detected so that the signal of this detection determines the exposure amount used during the holography procedures.

Considering first the manner in which a two-dimensional pattern is mathematically expressed as a combination of pattern elements, it is to be noted that the term "two-dimensional pattern" may be considered as referring to any types of patterns such as normalized figures, numerals, letters of the alphabet, Japanese syllabary, punctuation marks, sonant marks, and others.

Assuming that $g(x, y)$ and $f_i(x - \psi_i, y - \phi_i)$ indicate a character pattern and its identifying pattern element, respectively, where $x$ and $y$ are fixed coordinates of the character surface and $\psi_i$ and $\phi_i$ indicate that the character element is $f_i$ spaced from the character center $(0, 0)$ by a distance $(\psi_i, \phi_i)$, then the character may be expressed by the formula $$g(x, y)=\sum_{i}^{N}\gamma_i f_i(x-\psi_i,\ y-\phi_i) \qquad (1)$$

where $\gamma_i$ designates a two-value function which takes a value 1 when $g$ contains $f_i$ while taking another value 0 when $g$ does not contain $f_i$.

Specific examples of $f_i(x, y)$ are considered in connection with numerals, Japanese syllabaries and Chinese characters on the assumption that $\psi_i$ and $\phi_i$ are sufficiently small to be negligible as compared to the size of the particular character. The elements of numerals 0, 1, 2, . . . , 9 are illustrated in Table 1. When these elements are replaced by $f_1, f_2, \ldots f_9$, a numeral 8, for example may be expressed as $f_7+f_8+f_6$. As seen from the columns of element components, the numerals 1 and 0 are expressed by single identifying patterns, respectively, while the remainder of the numerals are expressed by a combination of two identifying patterns or bits, respectively. Thus, the numeral 8 is expressed, as shown in Table 1, by $(f_7+f_8)$ and $f_6$ is omitted since one or two identifying patterns or bits suffice to discriminate the patterns and in order to maintain the minimum degree of diffusion required for discrimination, only two identifying patterns are selected. A mathematically strict extraction of the elements of each numeral would result in each element being built up from a number of identifying patterns many of which would be redundant and useless for the purpose of pattern identification.

The identifying patterns are generally classified into line segments and partial or complete circles. The following consideration is given with respect to the basis for estimating similar elements such as 1) two line segments of different line thickness, 2) two homologous line segments, and 3) a vertical line segment and a line segment turned by an angle relative to the vertical line segment should be regarded as the same identifying patterns or as different identifying patterns. In the filtering method according to the present invention, the estimation is based on the level of correlative output of two identifying patterns. On the assumption that mutual correlation of 75 percent or more relative to the self correlation is transferred into the self correlation, two line segments which are different from each other in line thickness by 25 percent are regarded as the same line segments (this percentage being applicable also to two line segments which are of the same length but are different in thickness) with respect to the above classification 1). Two homologous line segments as referred to above in classification 2) are regarded as the same line segments where their homologous area ratio does not exceed 12.5 percent. With respect to the above classification 3), the angle of inclination $\theta$ may be given by $$\theta \leq 4s/1 + s^2 \times (1-\sigma)$$

where $s$ represents the ratio of length to thickness of a line segment and the mutual correlative output $o$ (0.75). In the case of $s = 4$, therefore, $\theta \leq 14°$. Such a relation may be introduced by a simple correlative integration. The similar relation is established with respect to the component of a partial or complete circular loop, so that the element $f_4$ of "5" as shown in Table 1 and an oval loop which is partly broken away in a lower portion of "5" provide an identical self correlative image.

Considering Table 2, the square Japanese syllabary illustrated therein is handled by way of 1 or 2 information bits or identifying patterns as illustrated. The square Japanese syllabary is generally characterized by 1) line segments which form almost all of the character elements and 2) a classification into about ten groups of similar characters. A common character element is established for each group while several classification elements are provided for discrimination between the similar characters included in the respective group. Although the classification elements generally correspond to the residual part of a character resulting from removing the common element therefrom, it is preferred to employ those identifying patterns which have therein a diverging point such as "⊣" or "⊥" in "ヨ" or "ユ," respectively. Japanese cursive syllabary contains character elements which are more complex than the square Japanese syllabary illustrated in Table 2, and there are almost no similar characters in such a cursive syllabary so that no particular decomposition or breaking down into characteristic identifying patterns is required. Thus, analysis according to different identifying patterns is necessary only within each group of similar characters, but each character itself may be regarded as an identifying pattern when the character can be discriminated from other characters on the basis of its own self correlative image.

With respect to Chinese characters, as shown in Table 3, classifications 1), 2), and 3) are set up and similar "left-hand radicals," "bodies," "crown parts," etc. contained in the characters which consist of a relatively few number of strokes are further broken down into identifying patterns. Pattern identification in the case of Chinese characters is difficult generally because of (I) their huge absolute number, (II) their complicated configuration, and (III) a lack of a definite system of classification and arrangement of the strokes. Nevertheless, it is possible to process Chinese characters with greater advantage according to the simplified optical system and electronic circuitry of the present invention than in the case of conventional techniques of character extraction such as the OCR techniques which rely upon detection of topological loops and diverging points as well as joint points for detection, both techniques relating to processing of a relatively large number of information bits, so that the number of characters is limited, for example, to 881 educational Chinese characters. With the present invention decomposition of these characters into a small number of identifying patterns is carried out in an orderly fashion and it is possible to identify even a relatively large number of Chinese characters as referred to above by combining no more than 4 identifying patterns in order to identify a given character.

Thus, while in the case of Table 1, the advantages achieved with the invention are not brought out with such great emphasis because 9 identifying patterns are used for ten numerals with the different unique combinations of no more than two identifying patterns being utilized for identifying the different numerical characters, the great advantages of the invention are readily and emphatically apparent from the case of Chinese characters where a large group is to be handled and it becomes possible by the system of identifying patterns of the present invention to combine a relatively small number of identifying patterns into unique groups for the purpose of effectively identifying a large number of patterns with a minimum degree of diffusion consistent with discrimination between similar characters so that the number of identifying patterns which are combined for identifying any one pattern of a group need not form the entire pattern which is to be identified.

Figure 3A:
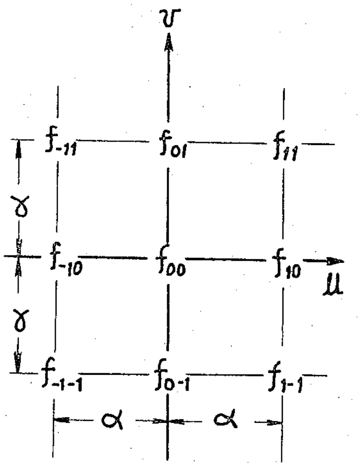
FIG. 3*a* illustrates the manner in which identifying patterns are distributed.

Referring now to FIG. 1, there is illustrated therein a system according to the present invention for bringing about multiplex storing of matched filters of identifying patterns. A coherent light source means 1 is made, for example, from an He-Ne laser (with a wave length of 6328A). Light rays which are emitted from the coherent light source means 1 travel through a shutter 2 and are enlarged by collimator lenses 3 and 4 into parallel light rays which travel along the optical axis along which the components 1–4 are arranged as illustrated. These parallel light rays provide illumination through a masking means in the form of a plate 6 formed with pinholes 6*a* therein. These pinholes 6*a* may include, for example, nine pinholes arranged in three horizontal rows and in three columns (with a spatial interval $\alpha$), as shown in FIG. 3*a*, for example, and the diameter of each pinhole is selected so that the light rays passing therethrough will be sufficient in diameter to cover a character element 9*a* which is one of the identifying patterns, as will be apparent from the description which follows. The masking means includes in addition to the pinhole plate 6 on mask 6*b* which covers all except one of the pinholes 6*a* at a given time so that the several pinholes 6*a* may be successively uncovered to illuminate each identifying pattern. The light rays which pass through a pinhole 6*a* reach a condensing lens 8 and are condensed thereby at a focus F thereof situated therefrom at a focal distance *f*. A carrier means 9 has the identifying patterns, such as those shown at the lower row of Table 1, recorded thereon so that the carrier means carries the identifying patterns, and one of these patterns is formed by the identifying pattern 9*a* which is schematically illustrated. It will be noted that the carrier means 9, in the form of a flat film, is situated at an input position along the optical axis which is spaced from the focal point F by a minute distance $\Delta$. It should be noted that the focal point F of condensing lens 8 is in coincidence with the front focal plane of a Fourier conversion lens means 11. The identifying patterns such as the pattern 9*a* which is stored in the carrier means 9 is in the form of a negative exposure as encountered in negative photographic film, and the minute distance $\Delta$ corresponds to a defocussing amount sufficient to cover the condensed light rays. The Fourier conversion lens means 11 operates as a Fourier converter for the image of the identifying pattern 9*a* and a Fourier converted image of the identifying pattern 9*a* is formed at the rear focal plane F′ of the lens 11, with this image at the rear focal plane F′ involving a predetermined amount of phase difference due to the defocussing amount $\Delta$. Thus, the light rays 10 which transmit the identifying pattern 9*a* and have passed through the lens 11 form the Fourier converted image of the identifying pattern, as pointed out above, at a point $C_{\mu\nu}$ in the rear focal plane of lens 11.

A hologram dry-plate 12, which forms a matched filter means, as referred to below, is arranged at the focal plane F′ and parallel reference light rays 7 at an angle $\theta_{\mu\nu}$ with respect to the hologram dry-plate 12 are directed so as to be incident upon the dry-plate 12 at the location $C_{\mu\nu}$, so that in this way a hologram is formed in order to store in this way a matched filter corresponding to the identifying pattern 9*a*. Thus, the hologram corresponds to a matched filter of the character element 9*a*.

The character elements or identifying patterns 9*a* are assumed to be $f_{\mu\nu}$ ($\mu, \nu = -1, 0, 1$), and the selected positions of the mask 6*b* depends upon the individual identifying pattern location, so that nine matched filters of the identifying patterns are distributed in the form of a lattice arrangement (in three vertical columns and three horizontal lines or rows), this arrangement resulting from the nine operations at the position $C_{\mu\nu}$ of the hologram dry-plate 12. This arrangement of the matched filters is illustrated in FIG. 3*a*. The angle $\theta_{\mu\nu}$ at which the reference light ray bundle 7 is directed to the focal plane F′ is dependent upon the individual elements *f* .

Assuming that the Fourier converted image of an identifying pattern $(x, y)$ is expressed by $F_{\mu\nu}$, $F_{\mu\nu} \equiv F_{\mu\nu}\ (u-\mu\alpha,\ v-\nu\alpha)$, where the coordinates $(x, y)$, $(u, v)$ are the coordinates of the front and rear focal planes of lens 11, respectively, and the phase term due to the defocussing amount $\alpha$ is neglected, then the reference light bundle 7 may be expressed as $\exp[jp(\mu lfu + \nu mfv)]$ where $p = 2\pi/\lambda f$, $\lambda$ representing the wave length of the coherent light, f representing the focal distance of the lens 11, and $l$, $m$ representing direction cosines of the reference light ray bundle (the direction cosines of the reference light ray bundles with respect to the character elements $f_{\mu\nu}$ are given by $\mu l, \nu m$).

The matched filters $H_{\mu\nu}$ of the character elements $f_{\mu\nu}\ (x, y)$ may be, therefore, expressed as follows:

$$H_{\mu\nu}\ (u, v) = F^*_{\mu\nu}\ (u-\mu\alpha,\ v-\nu\alpha)\ \exp[jp(\mu lfu + \nu mfv)] \quad (2)$$

where * represents a complex conjugate.

This matched filter $H_{\mu\nu}$ is used, as pointed out below, to produce a correlative image of a character $g_i(x, y)$ [Relation (1)] and $H_{\mu\nu}$. Thus, a group of identifying patterns are stored solely in an optical manner in the form of identifying patterns or character elements $f_{\mu\nu}$ of the assembled identifying patterns arranged in a matrix and in such a manner of storage which is one of the principle features of the present invention.

According to another possible method of multiplex recording of matched filters, multi-exposed holograms may be formed at the position given by $u = v = 0$, i.e., on the optical axis (in such a case also, the direction of reference light ray bundles depends upon the individual character elements). This method is, however, disadvantageous in that no faithfully correlative image is achieved since there occurs a saturation in a range of lower frequency due to the non-linearity of the dry-plate. Such a disadvantage is avoided by the multiplex storage system of the present invention where the ranges of frequency for the respective character elements are spatially separated according to a lattice distribution as pointed out above.

In order to form the reference light ray bundle 7, the parallel light rays which are enlarged by the collimator lenses 3 and 4 of the optical system are reflected by a semi-transparent mirror 5 which forms a deflecting means for laterally deflecting part of the light rays from the light source means 1. These deflected light rays pass through a variable radiation attenuator means 13, a reflex mirror 14, and a turnable reflex mirror 15, and then reach the hologram dry-plate 12 in order to uniformly illuminate the latter. The diameter of the reference light ray bundle 7 is selected, in the same way as the light ray bundle 10, so as to be substantially equal to the diameter of the pinhole 6a. The incident angle $\theta\mu\nu$ of the reference light ray bundle 7 may be selected by turning the rotatable reflex mirror 15 about vertical and horizontal axes with a suitable rotating or turning mechanism 16.

In accordance with a further feature of the invention normalized matched filters are stored by automatically compensating for variations in light intensity. The light intensity of the matched filter of a recorded identifying pattern depends upon whether this pattern is large or small and, as pointed out below, the correlative output signal level of an arbitrary pattern and an identifying pattern depends upon the individual identifying patterns, so that identification of patterns, particularly discrimination between similar patters, is rendered difficult if different light intensities are encountered. As a result matched filters of constant light intensity are formed independently of the particular identifying character by measuring the amount of light transmitted by each identifying character or pattern and correcting the exposure amount to form a hologram with respect both to the identifying pattern and the reference light ray bundle during the formation of the matched filter means of the invention.

Referring to FIG. 1, the ambunt of light 18 transmitted by the particular identifying pattern 9a is directed by a rotatable semi-transparent mirror 17 to a lens 19 and photoelectrically measured by a photoelectric unit 21 located at the focal point 20 of the lens 19. The semi-transparent mirror 17 is adjusted so that the amount of light 18 transmitted by the identifying pattern 9a is always condensed together with the light ray bundle 10 at the focal point 20. The semi-transparent mirror 17 is adapted to be inserted into the light path of the light rays 10 only during photoelectric light measuring operations while this mirror 17 is retracted during filter exposure. The signal which represents the amount of transmitted light is amplified by an amplifier 22 providing an output voltage $e_o$ which is inversely proportional to the amount of light 18 which is transmitted. A comparator unit 23 includes therein an oscillator adapted to produce a sawtooth wave voltage 24 illustrated in FIG. 1a, this voltage having a constant amplitude and a cycle T so that, after comparison of the output voltage $e_o$ with this sawtooth wave voltage 24, an output pulse 25 is achieved with a pulse width $t_o$ (time width) which is inversely proportional to the amount of light transmitted by the character element. This output pulse 25 is stored for each character element or identifying pattern in a register 26 as a number of clock pulses proportional to $t_o$. Inasmuch as any one of a number of selecting buttons (not shown) on an identifying pattern or character element selecting panel 26a is depressed during formation of the matched filters, a shutter operating pulse having the time width $t_o$ corresponding to the particular selected identifying pattern actuates a shutter driving unit 27 so that the shutter 2 is maintained open during this time period. On the other hand, the same shutter-operating pulse is applied to a step motor 13a which, in turn, rotates the variable radiation attenuator means 13, which is of the rotary type, so as to provide also an amount of light inversely proportional to the amount of light transmitted by the identifying pattern, as the reference light ray bundle 7. The electronic techniques utilized by this control means comprises a combination of well known techniques, and, therefore, detailed description thereof is omitted.

Thus, the light intensities of the identifying pattern holograms stored at the matched filter means is maintained uniform.

Figure 2:
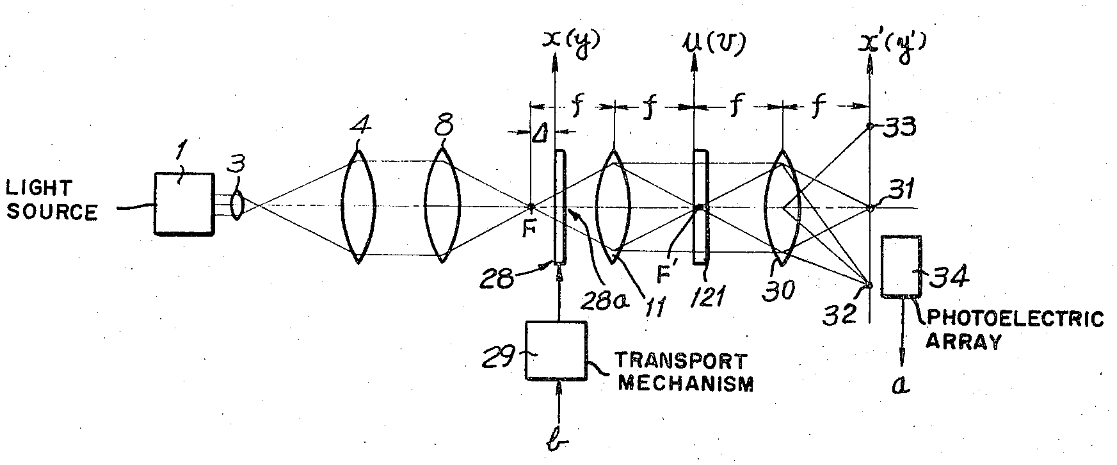
FIG. 2 is a schematic illustration of the optical system utilized during pattern identification, this optical system including the matched filter means manufactured with the arrangement of FIG. 1.

FIG. 2 shows diagrammatically an optical system for identifying patterns, this system using the matched filter means 121 derived from storing on the hologram dry-plate 12 the matched filters in the manner referred to above in connection with FIG. 1. Thus, the system of FIG. 2 is capable of achieving light correlation between an unknown input pattern and the matched filters of the identifying patterns which have been previously stored as described above.

In the system of FIG. 2, the light source means 1, the collimator lenses 3 and 4, the condensing lens 8, and the Fourier conversion lens means 11 are identical with those in the optical system of FIG. 1, but it will be noted that the shutter 2, the masking means 6, 6b, and the semi-transparent mirrors 17 and 5 as well as the optical system for the reference light ray bundle of FIG. 1 are omitted. The matched filters 121 stored in the hologram dry-plate 12 are located at the rear focal plane F′ of lens 11, which has the coordinates $u$, $v$. A carrier means or memory medium 28 which carries the input patterns such as pattern 28a is located at an input location along the optical axis formed by a plane which has the coordinates $x$, $y$ and which is spaced from the front focal plane of lens 11 by the distance Δ.

The system of FIG. 2 includes a reproducing lens means 30 which has a front focal plane coincident with the rear focal plane of lens 11, and by way of this reproducing lens means 30 a correlative image of the input pattern 28a and the identifying pattern filter 121 is produced at the position 32 of the negative primary diffracted light rays (this position being determined by the relationship (6) as will be described below) of the rear focal plane (having coordinates $x'$, $y'$) of the reproducing lens means 30. The deconvolution images are produced at the position 33 of the positive primary diffracted light rays. The point 31 is the central point on the optical axis of the output plane where the correlative images are formed at the location 32.

In view of relation (1) above, an unknown input character $g(x, y)$ is expressed as $$g(x, y)=\sum_{\mu}\sum_{\nu}\gamma_{\mu\nu}f_{\mu\nu}(x-\psi_{\mu\nu}, y-\phi_{\mu\nu}) \qquad (3)$$

and its Fourier converted image F($u$,$v$) produced in the focal plane F′ is expressed by $$F(u, v)=\sum_{\mu}\sum_{\nu}\gamma_{\mu\nu}(u-\mu\alpha, v-\nu\alpha)\exp[-jp(\psi_{\mu\nu}u+\phi_{\mu\nu}v)] \qquad (4)$$

The amount of light passing through the filter position of the identifying pattern $f_{\mu\nu}$ in the form of a matched filter in this plane F′ corresponds to the product of the matched filter $H_{\mu\nu}$ expressed by relation (2) and F($u$, $v$) of the above relation (4). This product $H_{\mu\nu}$ ($u$, $v$) x F($u$, $v$) is in the form of an inverse Fourier conversion as a result of the action of the reproducing lens means 30, and, as a result, a series of correlative images $\Sigma_{\mu\nu}$ are produced at the position 32 of the negative primary diffracted light rays as follows:

$$\sigma_{\mu\nu}=\sum_{\mu}^{N}\sum_{\nu}^{N}\gamma_{\mu\nu}\exp\,[jp\{\mu\alpha(x'+\mu'lf-\psi_{\mu\nu}) +\nu\alpha(y'+\nu mf-\phi_{\mu\nu})\}] \times\int_{-\infty}^{\infty}\int F^{*}_{\mu\nu}(s,t)F_{\mu\nu}(s,t) \times\exp\,[jp\{s(x'+\mu'lf-\psi_{\mu\nu}) +t(y'+\nu mf-\phi_{\mu\nu})\}]\,ds\,dt \tag{5}$$

where $\mu' = M + \mu + 1$.

Although ($\psi_{\mu\nu}$, $\phi_{\mu\nu}$) in the above relation (5) indicates that the identifying pattern is spaced from the center (0, 0) of the character $g$ ($x$, $y$) by ($\Psi_{\mu\nu}$, $\phi_{\mu\nu}$), there is actually established the following relation:

$$(\psi^2_{\mu\nu}+\phi^2_{\mu\nu})^{1/2}\max << \mu'lf,\ \nu mf$$

This means that a deviation based on $\psi$ and $\phi$ of the position on which the correlative image of each identifying pattern $f_{\mu\nu}$ is produced can be neglected in detection. The position of the correlative image with respect to the character element or identifying pattern $f_{\mu\nu}$ is given as follows:

$$x' = -\mu'lf,\ y' = -\nu mf \tag{6}$$

Figure 3B:
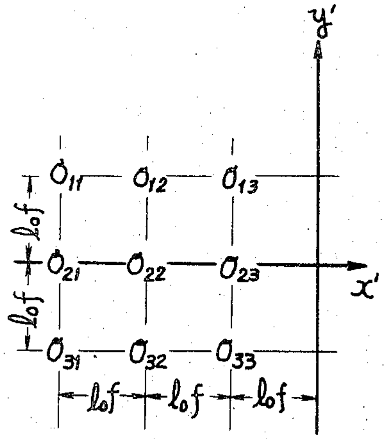
FIG. 3*b* illustrates the manner in which correlative images are distributed in an output plane.

It is assumed that a group of characters $\{g_i(x, y)\}$ are composed of nine elements, taking $\mu' = 3 + \mu + 1$ and $\mu,\nu = -1, 0, +1$, the matched filters of the identifying patterns being arranged according to a lattice distribution with the spatial interval $\alpha$ with respect to the lines and columns, and $l = m \approx l_o$. The matched filters under this assumption are arranged as illustrated in FIG. 3a. $f_{-11}$ and the like indicate the positions of the matched filters $f_{-11}$ and the like, respectively. FIG. 3b shows the positions $\Sigma_{\mu\nu}$ of the correlative images of the matched filters in the output plane relative to the identifying patterns $f_{\mu\nu}$. These correlative images are arranged symmetrically with respect to the origin because the associated deconvolution images appear at the positions ($\mu l_o f$, $\nu l_o f$) which are point symmetrical with respect to the correlative positions ($-\mu l_o f$, $-\nu l_o f$) of the identifying patterns $f+\mu+\nu$ and correlation of the character elements $f-\mu-\nu$ is superimposed thereon.

Thus, with the above structure of FIG. 2 it is possible to create at the location 32 of the output plane correlative images resulting from transmission of images of the patterns to be identified to the matched filter means 21 and resulting from the action of the reproducing lens means 30. A photosensitive means 34, in the form of an array of photoelectric elements, is situated at the region of the output plane, the number of photoelectric elements of the array 34 corresponding to the number of correlative images which can be provided and the distribution of these photoelectric elements is also the same as the distribution of the correlative images as illustrated in FIG. 3b. Thus, whenever a correlative image is formed at a location such as one of those shown in FIG. 3b, a photoelectric element of the array 34 will respond to transmitting corresponding electrical signal. Thus, through this photosensitive means the light intensity of a given correlative image is converted to an electrical signal in a photoelectric manner. When a character $g_i$ ($x$, $y$) is composed, for example, of $f_{-11}$, $f_{00}$ and $f_{10}$, sharp bright points of self correlative images appear at positions $\Sigma_{118\ 11}$, $\Sigma_{00}$ and $\Sigma_{10}$, while the mutual correlative image between the character $g_i$ and $f_{118\ 10}$, for example, is produced at a position entirely different from the nine self correlative images. The self correlative image will in general have a sharp bright intensity peak in a halo and the mutual correlative image is a relatively large blurred image, so that both images may be clearly discriminated. Thus, the positions of the self correlative images of the identifying patterns are decomposed into a matrix and in this way it is possible to provide photoelectric detection of a plurality of correlative images at the output plane in parallel and simultaneously.

Figure 4:
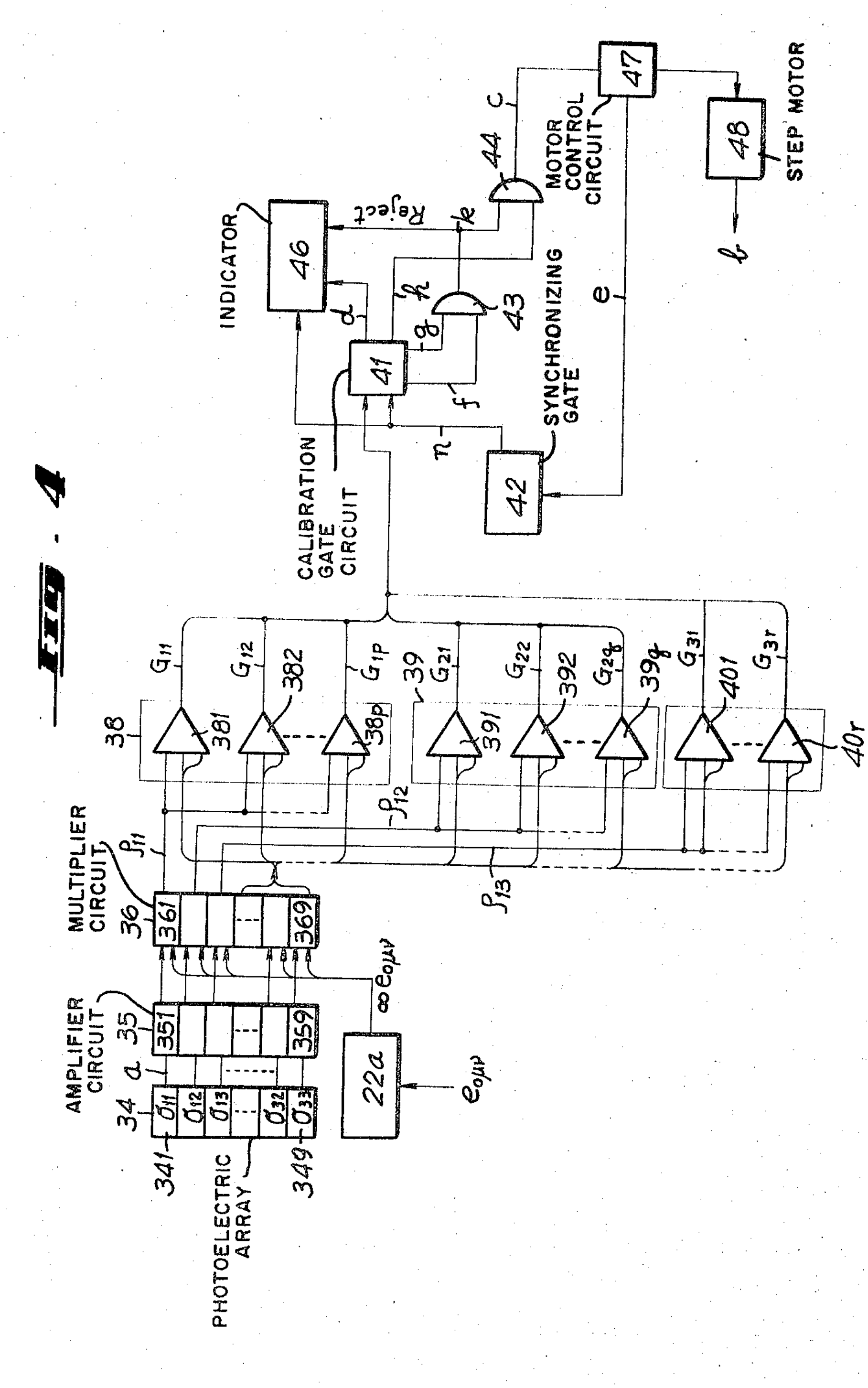
FIG. 4 is a block diagram of the identifying circuit means used to identify a pattern.

FIG. 4 illustrates an identifying circuit means according to the invention for identifying patterns with the photoelectric detection signals resulting from the response of the photosensitive means 34 to the correlative images. The correlative output signals $\Sigma_{11}$, $\Sigma_{12}$, $\Sigma_{13}$, . . . $\Sigma_{33}$ with respect to the nine identifying patterns 341, 342, . . . 349 of the photoelectric array 34, after being amplified by the unit amplifiers 351, 352, . . . 359 of the amplifier circuit 35, respectively, form an input into unit multipliers 361, 362, . . . 369 of a multiplier circuit 36, these inputs being in the form of multiplicands, respectively. Nine outputs $e_{o\mu\nu}$ from amplifier 22 of FIG. 1 of the shutter control system, on the other hand, which are inversely proportional to the amount of light transmitted by the identifying patterns $f_{\mu\nu}$ as pointed out above are stored in a register 22a in the form of DC voltage levels, respectively, and these stored signals form an input into corresponding unit multipliers 361, 362, . . . 369, these inputs forming the multipliers. As a result, the outputs of the multiplier circuit 36 correspond to the associated correlative outputs $\Sigma_{\mu\nu}$ normalized depending upon the sizes of the identifying patterns, and each output will have a normalized pulse form which is constant with respect to the amplitude or crest of its wave and its width.

It is assumed here that an assembly of characters $\{g_i(x, y)\}$ has common character elements $f_{11}$, $f_{12}$ and $f_{13}$ and classifying identifying patterns $f_{21}$, $f_{22}$, . . . $f_{33}$, while the groups of character elements $\{f_{11}\}$, $\{f_{12}\}$ *and* $\{f_{13}\}$ respectively comprise characters of which the number are $p$, $q$ and $r$, i.e., $g_{11}$, $g_{12}$, . . . $g_{1p}$; $g_{21}$, $g_{22}$, . . . $g_{2q}$; and $g_{31}$, $g_{32}$, . . . $g_{3r}$, respectively. A circuit 38 for identification of $\{f_{11}\}$ including AND circuits of which the number is $p$, *i, e.*, 381, 382, . . . 38p, has a pair of AND inputs into each of these AND circuits consisting of normalized correlative output $\rho_{11}$ corresponding to $\Sigma_{11}$ common to all of these AND circuits and one or two of the normalized correlative outputs $\rho_{21}$, $\rho_{22}$, . . . $\rho_{33}$ corresponding to the classification identifying patterns $f_{21}$, $f_{22}$, . . . $f_{33}$. It is apparent, therefore, that the characters $g_{11}$, $g_{12}$, . . . $g_{1p}$ have been identified, respectively, when the outputs $G_{11}$, $G_{12}$, . . . $G_{1p}$ of the AND circuits 381, 382, . . . 38$p$, respectively, are 1. The manner in which circuit 39 for identifying patterns $\{f_{12}\}$ and an identifying circuit 40 for identifying patterns $\{f_{13}\}$ operate identical to that described above in connection with identifying circuit 38 for the identifying patterns $\{f_{11}\}$.

In this way the identifying circuit means of the invention achieves a number of outputs, with this number corresponding to $\{p + q + r\}$ (which repel each other in correct identification) of the $\{f_{11}\}$ identifying circuit 38, the $\{f_{12}\}$ identifying circuit 39 and the $\{f_{13}\}$ identifying circuit 40, and these circuits all operate in parallel to form an input into a calibration gate circuit means 41 of the identifying circuit means of the invention. The calibration gate circuit means 41 initiates its calibration of the identification output upon application of a synchronizing signal n from a synchronizing gate 42. When the identifying circuits 38, 39 and 40 correctly accomplish their identifying operation only one of the outputs $G_{\mu\nu}$ is 1 with respect to the input pattern $f_{\mu\nu}$, and the identifying signal d corresponding to the output $G_{\mu\nu}$ records the character $g_{\mu\nu}$ at a predetermined position in a recorder (or display device) 46 which forms an indicating means for indicating the identified pattern, and at the same time a signal $h$ indicating completion of the identification is produced.

In the event that identifying circuits do not operate properly and no identification is accomplished (i.e., all of the identifying circuit outputs are or two or more identifying signals are simultaneously produced, which is to say two or more $G_{\mu\nu}$ outputs are 1), then the calibration gate circuit means 41 will put out a misconception signal $f$ for the case of no identifying circuit output and a signal $g$ for the case of more than one identifying circuit output, and these signals are transmitted to an OR circuit 43 as an input thereto. Whenever either of these signals is received by the OR circuit 43, this circuit provides an output signal $k$ which is transmitted to the indicating means 46 as a "reject" signal and simultaneously this signal $k$ is transmitted to an OR circuit 44 which also receives the signal $h$ of completion of identification as an input. From either of these signals the OR circuit 44 will provide an output signal C as an input a motor control circuit 47 which operates a step motor 48, and when the latter thus starts to operate it produces rotation of a motor shaft $b$ which forms part of a transporting means 29 in the form of a film transport mechanism shown in FIG. 2 operatively connected with the carrier means 28 which carries the input patterns 28$a$ which are to be identified. In this way the carrier means or memory medium 28 is transported so as to be displaced to situate the next pattern to be identified at a location along the optical axis for repetition of the above procedures. The transporting means 29 is arranged as a mechanism which will convert the rotary movement of the shaft $b$ into a linear movement, this mechanism including, for example, a rack and pinion, as well known. In the motor control circuit 47, therefore, a number of pulses corresponding to the amount of required displacement of the carrier means 28 are produced from the instant when the motor starting signal C is produced and upon application of these pulses the step motor 47 starts to operate. On the other hand, a signal $e$ of completion of the operating cycle from the motor control circuit 47 is formed at an input into the synchronizing gate which, in turn, produces the synchronizing signal $n$ after a given time delay, so that this signal $n$ serves as an order for starting the identification operation. This synchronizing signal $n$ forms an input also into the indicating means or recorder 46, and serves also as an order for designating or shifting the address of the identified character signal G.

Inasmuch as soft functions of the calibration gate circuit 41 are derived from conventional known techniques, further description thereof is not required.

Although the input patterns to be identified have been referred to above as transparent patterns of a negative type, patterns of a positive type may also be handled, such as ordinary printed or type-written characters, and these patterns may be identified since the Fourier converted images of the characters and the complex amplitude distribution of the identifying patterns or character elements stored by the matched filters with patterns of a positive type are complementary to those of characters of the negative type according to the so-called Babinet's principle. Actually, however, the positive patterns may be handled with particular attention in view of, for example, the fact that the definition "pattern of positive type" necessarily includes an opening (usually a rectangular frame). Furthermore, the penetrating power ratio or the contrast between the dark portion corresponding to the printed character and the white portion corresponding to the background which is usually from 60 to 80 percent must be improved, for example, by oil immersion of the recording medium (white paper). As an alternative method, instead of utilizing a memory medium on which the positive patterns or characters are stored as a direct input, such positive characters or patterns may be converted once by a pick-up tube (flying spot tube) and then form an input into the optical input plane.

As is apparent from the above description, the system of the present invention satisfies the above requirements I) – V). Thus, 1) two-dimensional patterns are decomposed or broken down into basic identifying patterns or character elements according to which the minimum degree of diffusion required for identification is maintained; 2) correlative images from coherent light are used as the method for quantization of the pattern information according to the identifying patterns; 3) the pattern information is stored in the form of basic identifying patterns as matched filters which form solely optical memories; 4) these pattern element filters are stored in multiplex form so that spatial frequencies are spaced in a lattice arrangement depending upon the particular identifying patterns; 5) both the identifying pattern filter and the self correlative output thereof are normalized on the basis of the amount of light transmitted by the identifying patterns so as to improve the discrimination ratio of the self correlative image; and 6) photoelectric detection of the correlative output is carried out in parallel and simultaneously with a number of correlative images because of the arrangement of these images in a lattice distribution.

Thus, the system of the present invention is advantageous in that first, the system is economically compact since the patterns are stored in a purely optical manner so that memory functions by means of computers as conventionally employed in well-known OCR systems may be omitted; second, character scanning mechanism, quantization circuit structure, and optical characteristic extracting mechanism as employed with OCR systems may be omitted and at the same time the operation of reading out may be achieved at a high velocity with the light-filtering system of the invention comprising an optical system which provides the function of processing two dimension identifying patterns simultaneously, in contrast with optical systems of the type encountered in conventional OCR systems which merely have a series of basic functions of illuminating, scanning, and dividing the patterns; and third, patterns of a range much wider than in well-known OCR systems, such as Japanese syllabary and Chinese characters may form the group of patterns to be identified with the present invention since it is possible according to the present invention to process normalized partial pattern information having a minimum degree of diffusion consistent with pattern identification. If the correlation during light filtering is carried out as as assembly of basic character elements of a pattern group in a mathematically strict sense or by the system of correlatively detecting a diverging point or an intersection of the pattern, the degree of diffusion of the pattern information would be excessively large (i.e., there would be much too many information bits or identifying patterns) in both of these cases, so that not only the optical system for correlation but also the pattern quantization circuit and the identification circuit would become too complicated and the cost to high to provide an identifying system for a large amount of patterns. These disadvantages are avoided by utilizing the light correlation system based on the partial identifying patterns according to the present invention, and the device for pattern identification according to the system of the present invention is considerably simplified as contrasted with OCR systems or known light-filtering techniques. Thus, these features of the present invention effectively enlarge the field in which it is presently possible to make practical use of known OCR systems and at the same time brings about a progress in the field of information processing in combination with information-searching techniques.

What is claimed is:

1. In a system for identifying patterns of a given group of patterns, matched filter means for storing a group of identifying patterns distributed in a lattice arrangement and respectively having configurations most of which conform to parts of the patterns to be identified with one or a combined limited number of said stored identifying patterns being capable of identifying a pattern without necessarily conforming to the configuration of the entire pattern which is to be identified, optical means coacting with said matched filter means for transmitting thereto an image of a pattern which is to be identified and for forming in an output plane from the stored identifying patterns of said matched filter means and from the pattern image transmitted thereto one or a limited number of correlative images capable of identifying the pattern transmitted by said optical means to said matched filter means, photosensitive means situated in the region of said output plane for responding to the correlative images and for creating electrical signals respectively corresponding to said correlative images, and identifying circuit means electrically connected with said photosensitive means for receiving said signals therefrom and for processing said signals to derive therefrom an indication of the identified pattern, said optical means having an optical axis along which said matched filter means is located, said optical axis having an input location and said matched filter means being situated between said input location, said carrier means carrying patterns which are to be identified, said identifying circuit means including a calibration gate circuit means for receiving the processed signals and performing an identifying operation thereon, a recording means electrically connected with said calibration gate circuit means for receiving an identification signal therefrom and indicating the identified pattern, and transporting means electrically connected on the one hand with said calibration gate circuit means and on the other hand with said carrier means for receiving from said calibration gate circuit means an operation completion signal and for responding to the latter signal for transporting said carrier means to situate the next pattern to be identified at the input location.

2. The combination of claim 1 and wherein said identifying circuit means includes a plurality of AND circuit means for receiving said signals from said photosensitive means and for responding to predetermined combinations of said signals transmitted by said photosensitive means for transmitting a corresponding identifying signal to said calibration gate circuit means.

3. The combination of claim 1 and wherein a Fourier conversion lens means is situated along the optical axis of said optical means between said input location and said matched filter means for transmitting a Fourier converted image of an input pattern which is to be identified to said matched filter means, and said optical means further including between said matched filter means and said output plane a reproducing lens means for forming the correlative images at said output plane.

4. The combination of claim 3 and wherein said input location is slightly spaced from a front focal plane of said Fourier conversion lens means for providing a given degree of defocussing.

5. The combination of claim 4 and wherein said reproducing lens means has a front focal plane coinciding with a rear focal plane of said Fourier conversion lens means, said matched filter means being situated at said front focal plane of said reproducing lens means, and said reproducing lens means forming deconvolution images with positive primary diffracted light rays and said correlative images with negative primary diffracted light rays, said photosensitive means being aligned with the negative primary diffracted light rays at said output plane for responding to the correlative images.

* * * * *